US010491486B2

United States Patent
Bakalov (10) Patent No.: US 10,491,486 B2
(45) Date of Patent: Nov. 26, 2019

(54) SCALABLE PERFORMANCE MANAGEMENT SYSTEM

(71) Applicant: SevOne, Inc., Boston, MA (US)

(72) Inventor: Vesselin Bakalov, Newark, DE (US)

(73) Assignee: SevOne, Inc., Boston, MA (US)

(*) Notice: Subject to any disclaimer, the term of this patent is extended or adjusted under 35 U.S.C. 154(b) by 0 days.

(21) Appl. No.: 15/489,281

(22) Filed: Apr. 17, 2017

(65) Prior Publication Data

US 2017/0222885 A1  Aug. 3, 2017

Related U.S. Application Data

(60) Continuation of application No. 14/222,012, filed on Mar. 21, 2014, now Pat. No. 9,660,872, which is a
(Continued)

(51) Int. Cl.
*G06F 11/30* (2006.01)
*H04L 12/24* (2006.01)
(Continued)

(52) U.S. Cl.
CPC .......... *H04L 41/24* (2013.01); *G06F 11/3006* (2013.01); *G06F 11/3419* (2013.01);
(Continued)

(58) Field of Classification Search
CPC .. G06F 11/3006; G06F 11/3419; H04L 12/28; H04L 29/08; H04L 41/042; H04L 41/24; H04L 41/5009; H04L 67/104
(Continued)

(56) References Cited

U.S. PATENT DOCUMENTS 5,745,763 A   4/1998   Mealey et al.
6,393,560 B1  5/2002   Merrill et al.
(Continued)

FOREIGN PATENT DOCUMENTS

WO   20100053782         5/2010
WO   20120092065         7/2012
WO   2019023227 A1       1/2019

OTHER PUBLICATIONS

"Comparison of Linux Distributions", Comparison of Linux distributions—Wikipedia, the free encyclopedia. (online] Aug. 5, 2005 19-21 [retrieved on Sep. 14, 2018]., Aug. 5, 2005, 8 pages.
(Continued)

*Primary Examiner* — John H Le
(74) *Attorney, Agent, or Firm* — GTC Law Group PC & Affiliates (57) ABSTRACT

A performance management system, having a peer-to-peer architecture, enables performance transparency in computer information systems, providing granular performance data and scalability. Peer appliances in a computer information system collect performance data. When a user requests a performance report, an originating peer appliance may determine which peer appliances contain the data required for the report and what data processing, if any, is required. The originating peer appliance may send requests indicating what data and what data manipulation processing is required. Each of the receiving peer appliances (including the originating peer appliance) may perform its own portion of the data processing. The originating peer appliance may receive resultant data from the peer appliances (including itself) and combine the resultant data into the requested report for the user. The performance management system distributes significant data processing across the peer appliances, avoids bottlenecks, and increases system scalability.

23 Claims, 6 Drawing Sheets

Related U.S. Application Data division of application No. 12/260,757, filed on Oct. 29, 2008, now Pat. No. 8,744,806.

(51) Int. Cl.
*H04L 29/08* (2006.01)
*G06F 11/34* (2006.01)
*H04L 12/28* (2006.01)

(52) U.S. Cl.
CPC .............. *H04L 12/28* (2013.01); *H04L 29/08* (2013.01); *H04L 41/042* (2013.01); *H04L 41/5009* (2013.01); *H04L 67/104* (2013.01)

(58) Field of Classification Search
USPC ................... 702/182, 186; 707/770, 999.01; 709/203, 220, 224; 719/319
See application file for complete search history.

(56) References Cited

U.S. PATENT DOCUMENTS

| | | |
|---|---|---|
| 7,010,584 B1 | 3/2006 | Craft |
| 7,103,640 B1* | 9/2006 | Overton ............ G06F 17/30106 707/999.01 |
| RE43,716 E | 10/2012 | Wang |
| 9,304,780 B2 | 4/2016 | Srinivasan et al. |
| 9,380,456 B1 | 6/2016 | Lee et al. |
| 9,660,872 B2 | 5/2017 | Bakalov |
| 2002/0157001 A1 | 10/2002 | Huang et al. |
| 2004/0044727 A1* | 3/2004 | Abdelaziz ........... H04L 61/3065 709/203 |
| 2004/0153641 A1 | 8/2004 | Ritchie |
| 2005/0055322 A1 | 3/2005 | Masters et al. |
| 2005/0172294 A1 | 8/2005 | Kanemura et al. |
| 2007/0039009 A1 | 2/2007 | Collazo |
| 2007/0055860 A1 | 3/2007 | Wang |
| 2008/0034238 A1 | 2/2008 | Hendry et al. |
| 2008/0133903 A1 | 6/2008 | Sun |
| 2012/0066375 A1 | 3/2012 | Phaal |
| 2013/0054955 A1 | 2/2013 | Oh et al. |
| 2015/0012739 A1 | 1/2015 | Yang et al. |
| 2015/0331692 A1 | 11/2015 | Schekochikhin et al. |
| 2016/0092203 A1 | 3/2016 | Khalid et al. |
| 2018/0081629 A1 | 3/2018 | Kuhhirte et al. |
| 2018/0123975 A1 | 5/2018 | Ayandeh |
| 2018/0136940 A1 | 5/2018 | Mallichan et al. |
| 2019/0026104 A1 | 1/2019 | Kessler et al. |

OTHER PUBLICATIONS

"RAM Drive", RAM drive—Wikipedia, the free encyclopedia. [online] Jul. 6, 2012 [retrieved on Sep. 14, 2018)., Jul. 6, 2012, 4 pages.

PCT/US18/43481, "International Application Serial No. PCT/US18/43481, International Search Report and Written Opinion dated Oct. 4, 2018", SevOne, Inc., 12 Pages.

\* cited by examiner

SCALABLE PERFORMANCE MANAGEMENT SYSTEM

CROSS REFERENCE TO RELATED APPLICATIONS

This application is a continuation of U.S. application Ser. No. 14/222,012, filed Mar. 21, 2014 entitled "SCALABLE PERFORMANCE MANAGEMENT SYSTEM" which is a divisional of U.S. application Ser. No. 12/260,757, filed Oct. 29, 2008, now U.S. Pat. No. 8,744,806, issued Jun. 3, 2014 entitled "SCALABLE PERFORMANCE MANAGEMENT SYSTEM", the entirety of the above applications are incorporated herein by reference.

BACKGROUND

Computer information systems typically include multiple computing devices. The computing devices may include workstation computers, network equipment, server computers, and the like. The computing devices may generate performance data. For example, a computing device may generate a series of time-stamped data points indicative of Central Processing Unit (CPU) usage.

Performance management systems collect and process performance data. The performance data may be used to troubleshoot past incidents, to report on present performance, and to plan for future growth. For example, granular past performance data may be used to identify a root cause of a network outage. Performance data indicative of present performance may be used to demonstrate compliance with service-level agreements (SLAs).

As the computer information system grows, the amount of performance data becomes significant, and the effectiveness of legacy performance management systems degrades. For example, where a single, central reporting computer receives data from many collectors, the central reporting computer is often responsible for the storage and processing of the performance data for the entire computer information system. The reporting computer becomes overloaded with information.

The cost-benefit of scaling such legacy systems is limited. The central reporting computer's processing and storage hardware capability may be increased, so that it can process more performance data. The granularity of the performance data may be reduced, so that there is less performance data to process. The former makes the legacy system more expensive, and the latter makes the legacy system less useful. For example, a network traffic spike lasting five seconds is all but impossible to diagnose if the performance data granularity is set at 60-second samples; however, such a spike can disrupt many applications, including Voice over Internet Protocol, financial trading transactions, and other latency-sensitive communications. As the demand for performance transparency in computer information systems increases, the cost-effective delivery of performance data takes on a strategic importance.

SUMMARY

Described is a performance management system. The performance management system's peer-to-peer architecture enables performance transparency in computer information systems, providing granular performance data and scalability.

Peer appliances may be deployed in a computer information system. Each peer appliance may receive performance data from a subset of computing devices. Each peer device stores its respective performance data in a corresponding datastore. Storing a subset of the overall performance data at each peer appliance increases the overall amount, and thus, the granularity of historic performance data available to the performance management system.

A user may log on at any peer appliance (i.e., the "originating" or "local" peer appliance) and request a performance report. For example, the performance report may include a listing of detailed historic performance data, a processed network-view chart, a time-series graph, or the like. In response, the local peer appliance may determine which peer appliances in the performance management system contain the data required for the report and what data processing, if any, is required. The local peer appliance may send one or more requests to itself and other peer appliances (i.e., 'remote' peer appliances). The requests may indicate what data and what data processing is required for the report.

Each of the peer appliances that receives a request may perform a respective data query to its datastore. Each may perform its own portion of the data processing required for the report. The local peer appliance may receive resultant data from itself and the other peer appliances. The local peer appliance may combine the resultant data into the requested report for the user. Distributing the significant data storage and processing across multiple peer appliances in the performance management system reduces bottlenecks and increases scalability.

DETAILED DESCRIPTION

Figure 1:
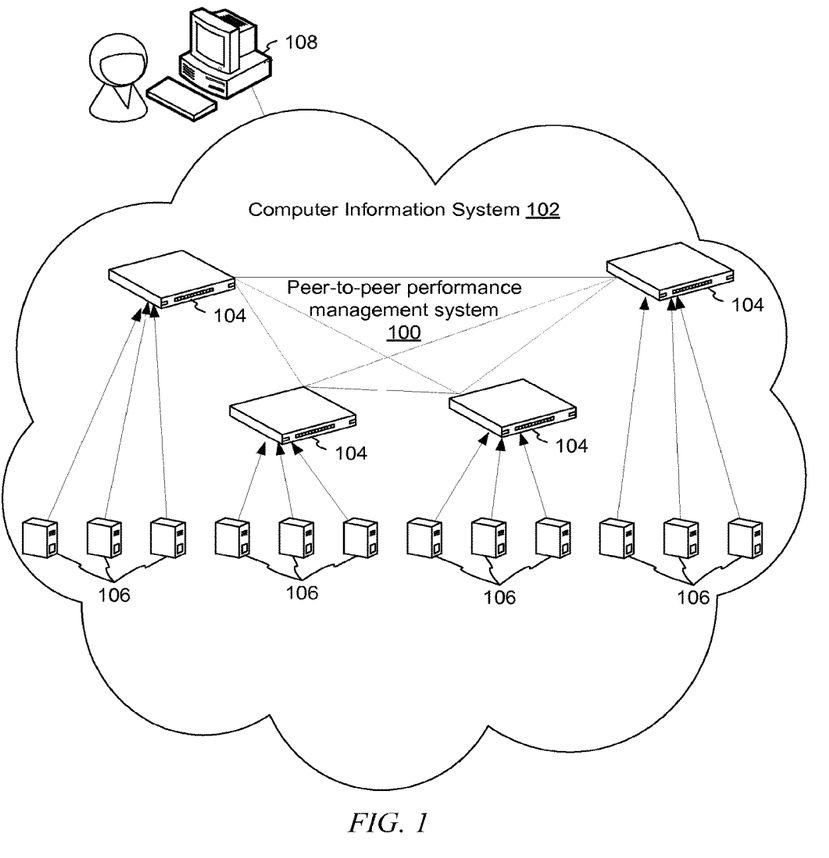
FIG. 1 is a block diagram of an example performance management system.

FIG. 1 is a block diagram of an example performance management system 100 for a computer information system 102. The performance management system 100 may enable performance transparency for the computer information system 102, providing granular performance data and scalability.

The performance management system 100 may include one or more peer appliances 104. The peer appliances 104 may be interconnected in a peer-to-peer architecture. For example, the peer appliances 104 may be networked such that each peer appliance 104 is in communication with each other peer appliance 104. The peer-to-peer architecture may present a logically flat topology of peer appliances 104.

Each peer appliance 104 may correspond to one or more computing devices 106 in the computer information system 102. The computing devices 106 may include workstation computers, networking equipment, server computers, and the like. Workstation computers may include desktop computers, laptop computers, personal digital assistants, smart phones, tablet PCs, and the like. Networking equipment may include hubs; bridges; switches; routers; network appliances such as firewalls, VPN appliances, Web proxies, etc.; Voice over Internet Protocol (VoIP) devices such as VOIP clients, VoIP gateways, VoIP proxies, etc.; and the like. Server computers may include business information servers, database servers, customer relationship management servers, web servers, document management servers, storage area networks systems, and the like. The computing devices 104 may be organized in a network such as a Local Area Network (LAN), Wide Area Network (WAN), Metropolitan Area Network (MAN), extranet, intranet, and internet network. For example, the computer information system 102 may be managed, owned, and/or operated by a commercial organization, a government organization, an educational organization, or the like.

Each of the computing devices 104 may provide performance data. Performance data may include any information indicative of a present and/or past observable aspect of operation. For example, the performance data may include CPU utilization, memory utilization, disk input-output utilization, disk storage capacity information, interface input-output utilization information, CPU process thread count, active/standby device status, jitter, latency, average round-trip time, bandwidth utilization, late and/or lost packet information, and packet out of sequence information, and the like.

The performance data may be received by a corresponding peer appliance 104. The peer appliances 104 may receive periodic performance data messages from the computing devices 104. The peer appliances 104 may periodically poll the computing devices 104 for performance data. The performance data may be formatted and transmitted/received via a network management protocol. For example, performance data may be formatted and transmitted/received via Simple Network Management Protocol (SNMP), proxy pinging, portshaker protocol, CISCO™ IOS IP Service Level Agreement protocol, and the like.

The performance data may be formatted and transmitted/received via a custom protocol. For example, a script may be authored to enable the peer appliance 104 to communicate via a custom protocol specific to one or more computing devices 106. The script may include computer executable code that when executed, properly formats, processes, and parses the specific performance data.

A peer appliance 104 may present a user interface via a Hypertext Transport Protocol (HTTP) session with a web browser software of a client computer 108. The user may log into any of the peer appliances 104. The user may interact with the user interface. The user may view, add, edit, or remove configuration data. For example, the user may add new computing devices 104 to the performance management system 100, assigning them to a peer appliance 104. For example, the user may move a computing device from one peer appliance 104 to another. The user may add or remove a peer appliance 104 from the performance management system 100.

The user may request a performance report. The performance report may be any presentation of performance data. The performance report may include a chart, graph, and/or table based on the performance data. The performance report may include aggregated data, such as an overall network utilization report. The performance report may include detailed troubleshooting data, such as a time series plot of CPU utilization for a specific group of computing devices 106. The report may include data that has been mathematically processed, such as averages, minimums, maximums, trend data, extrapolated data, polynomial fit data, sorted data, filtered data, and the like. For example, the performance reporting may be an application report, Internet Protocol report, network report, Quality of Service (QoS) report, or the like.

When the user requests a performance report, the peer appliances 104 may coordinate with each other to retrieve data identified by the subject matter of the performance report and to distribute the processing required for generation of the performance report.

Figure 2:
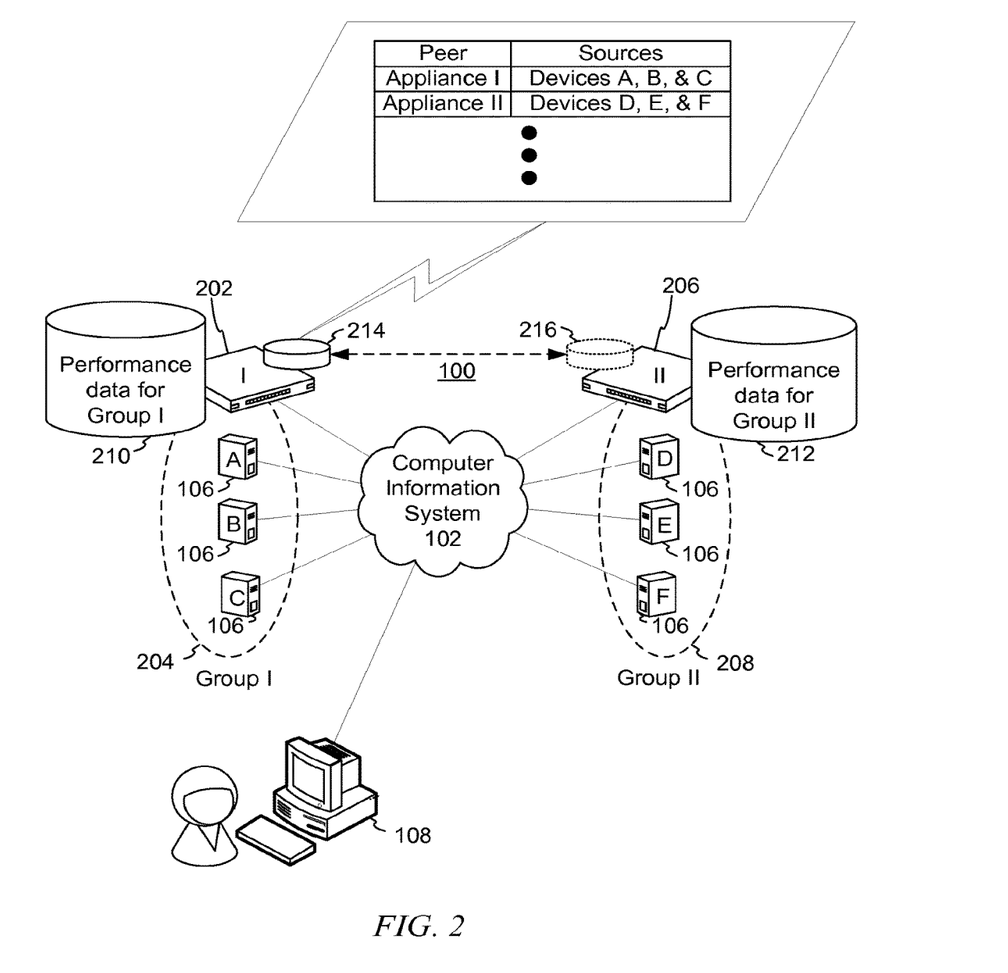
FIG. 2 is a block diagram of an example performance management system.

FIG. 2 is a block diagram of an example performance management system 100. As illustrated, a first peer appliance 202 may correspond to a first group 204 of computing devices 106 in a computing information system 102. A second peer appliance 206 may correspond to a second group 208 of computing devices 106 in the computer information system 102. The first peer appliance 202 may receive performance data from each of the computing devices 106 in the first group 204. The second peer appliance 206 may receive performance data from each of the computing devices 106 in the second group 208. The first peer appliance 202 may maintain first performance data 210 corresponding to the computing devices 106 in the first group 204. The second peer appliance 206 may maintain second performance data 212 for computing devices 106 that correspond to the second group 208. FIG. 2 illustrates a system with two peer appliances 202, 206; however, the performance management system 100 may be implemented with any number of peer appliances 202, 206.

The first peer appliance 202 may maintain first mapping data 214. The first mapping data 214 may include information that describes the relationship between peer appliances 202, 206 and computing devices 106. As illustrated, the first peer appliance 202 may correspond to Devices A, B, and C (i.e., the computing devices 106 of the first group 204). The second peer appliance 206 may correspond to Devices D, E, and F (i.e., the computing devices 106 of the second group 208). The first mapping data 214 may represent a logical topology of the performance management system 100. The first mapping data 214 may include data indicative of each computing device from which performance data is received and that computing device's corresponding peer appliance 202, 206.

The first mapping data 214 may be stored in a database. The first mapping data 214 may be stored in the same database as the first performance data 210. The first mapping data 214 may be stored in a database separate from the first performance data 210.

The second peer appliance 206 may maintain second mapping data 216. The second mapping data 216 may be a replicated copy of the first mapping data 214. The first mapping data 214 and the second mapping data 216 may be kept in synchrony according to a database replication process. For example, updates to the first mapping data 214 may be propagated to the second mapping data 216 via the database replication process. The first peer appliance 202 may be designated as a primary source of mapping data. The database replication may maintain synchronized copies of the mapping data at each peer appliance 202, 206 in the performance management system 100. Thus, each peer appliance 202, 206, via the mapping data, may have a current topology of the relationships between computing devices 106 and peer appliances 202, 206.

The user may log in to any peer appliance 202, 206. When a user logs in to the peer appliance 202, 206, it may be considered the originating (i.e., "local") peer appliance 202 for that session (for illustration purposes consider the first peer appliance 202 as shown in FIG. 2 to be the local peer appliance 202). The local peer appliance 202 presents the user with a user interface. The user interface may include a collection of dynamic webpages.

The user may request a performance report that implicates one or more computing devices 106. The local peer appliance 202 may determine from the mapping data which peer appliances 202, 206 (including itself) may be queried to obtain the data required for the report. For example, a user, logged in at the first peer appliance 202, may request that the daily average memory utilization for the past week for Device A and Device D be displayed. The first peer appliance 202 may determine from the mapping data that Device A corresponds to the first peer appliance 202 and the Device B corresponds to the second peer appliance 206. The local peer appliance 202 may consider the nature of the report and determine what, if any, data manipulation process may be performed. The first peer appliance 202 may determine a data manipulation process of daily average and a filter set to include the past week of memory utilization data is required for the report.

Figure 3:
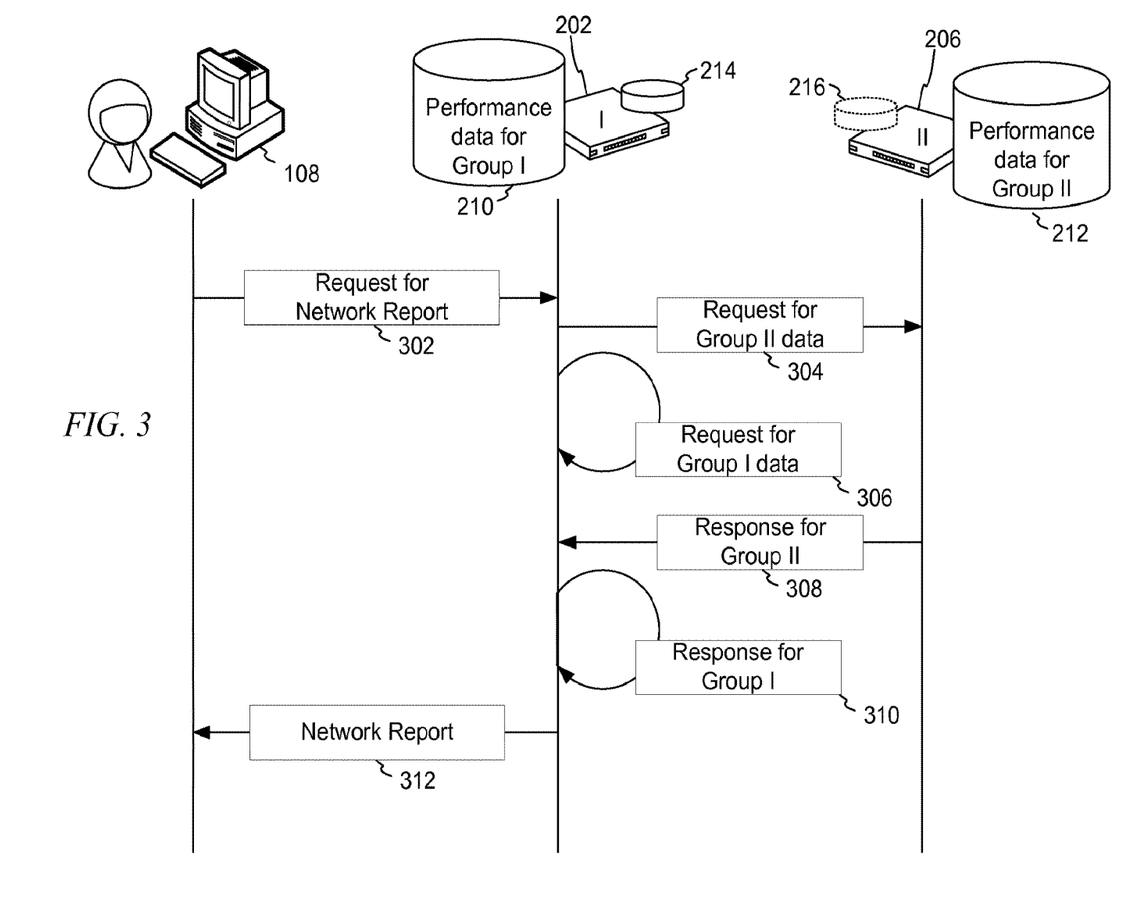
FIG. 3 is an example message flow for processing a report request.

FIG. 3 is an example message flow for processing report request. At 302, the user may make a request for a performance report. The request may be sent to the first peer appliance 202. To illustrate, the user may request a "top ten most-utilized network interfaces" report. This report would present a listing of the top most-utilized network interfaces of computing devices throughout the network.

Upon receipt of the request for the report, the first peer appliance 202 may consult its replicated copy of the mapping data (i.e., the first mapping data 214) to determine which peer appliances 202, 206 maintain the performance data required to complete the request for the report. For purposes of this illustration, both the first peer appliance 202 and the second peer appliance 206 have performance data associated with the report. In this illustration, the performance data required may include interface utilization data.

The first peer appliance 202 may determine what data manipulation process is required, if any. The data manipulation process may include a sorting and filtering operation that selects the top ten most utilized interfaces from the group of computing devices.

At 304, the first peer appliance 202 sends a remote request for performance data to the second peer appliance 206. The remote request may indicate the data related to the report and any data manipulation process required for the report. For example, the second peer appliance 206 may select the top ten most-utilized interfaces from among those represented in the second performance data 212.

At 306, the first peer appliance 202 queries itself. This local request also specifies the data related to the report and any data manipulation process required for the report. Similarly, the first peer appliance 202 may select the top ten most-utilized interfaces from those represented in the first performance data 210. Thus, both the first peer appliance 202 and the second peer appliance 206, in this example, share the processing required for the report.

At 308, upon completion of the processing of the performance data, the second peer appliance 206 may return some intermediate data to the first peer appliance 202. Intermediate data may represent an output of the data manipulation process indicated in the request (e.g., the top ten most-utilized interfaces from among those represented in the second performance data 212).

Similarly, at 310, the first peer appliance 202 may return to itself intermediate data (e.g., the top ten most-utilized interfaces from those represented in the first performance data 210) that corresponds to a characteristic of the report.

The local and remote requests at 306 and 304 may occur in series or in parallel. For example, the local request at 306 may be sent after having received the intermediate data associated with the remote request at 304. The local request at 306 may be sent at the same time as the remote request at 306. Generally, parallel requests may reduce the overall delay in providing a report to the user.

Upon receipt of the intermediate data from the second peer appliance 206 and from itself, the first peer appliance 202 may generate a performance report and present a performance report to the user, at 312. In total, the first peer appliance 202 may receive the top 20 most-utilized interfaces (i.e., ten interfaces from each of the first peer appliance 202 and the second peer appliance 206). The first peer appliance 202 then selects the overall top ten from this received top 20. Thus, the processing and storage requirements for the performance management system is distributed among the peer appliances 202, 206.

Figure 4:
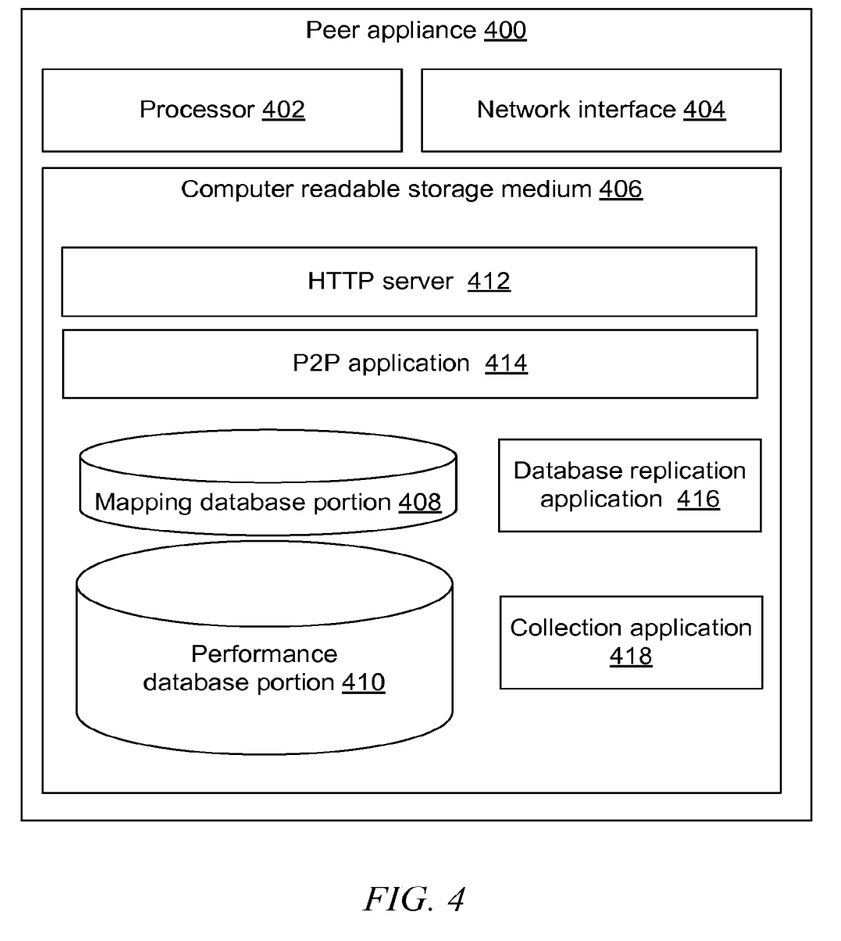
FIG. 4 is a block diagram of an example peer appliance.

FIG. 4 is a block diagram of an example peer appliance 400. The peer appliance 400 may include a processor 402, a network interface 404, and/or a computer readable storage medium 406. The peer appliance 400 may be a low-profile, rack-mountable server computer, a blade server, or the like. The processor 402 may be any device, system, or subsystem suitable for processing information such as a microprocessor, parallel processor, microcontroller, or the like. The network interface 404 may be any device, system, or subsystem to provide network communication. The network interface 404 may provide communication from the peer appliance 400 to other devices such as computing devices and other peer appliances. The network interface 404 may include an Ethernet interface, Gigabit Ethernet interface, fiber channel interface, token-ring interface, FDDI interface, wireless Ethernet, and the like.

The network interface 404 may enable communication between the peer appliance 400 and the corresponding computing devices that the peer appliance monitors. The peer appliance 400 may use the network interface 404 to send polling messages to the computing devices and to receive performance data from the computing devices. The network interface 404 may be configured with an open-port to receive periodic performance data from the computing devices. network interface 404 may be used to send and receive data to and from other peer appliances in the performance management system.

The computer readable storage medium 406 may include any device, system or subsystem suitable for storing and retrieving information. For example, the computer readable storage medium 406 may include random access memory, read-only memory, flash memory, magnetic storage memory, optical storage memory, a storage area network (SAN), or the like. The computer readable storage medium 406 may be a combination of random access memory and magnetic storage hard disk memory.

The computer readable storage medium 406 may have stored therein a mapping database 408 and a performance database 410. The computer readable storage medium 406 may have stored therein computer executable code for a Hypertext Transport Protocol (HTTP) server 412, a peer-to-peer application 414, a database replication application 416, and a collection application 418.

The mapping database 416 and the performance database 410 may be in separate databases. The mapping database 416 and the performance database may be in the same database. The database or databases may include an ORACLE™ database, a MYSQL™ database, a D-BASE™ database, or the like.

The mapping database 408 may maintain information describing the topology relationship between peer appliances and computing devices in the performance management system. The mapping database 408 may be updated whenever computing devices are added to, removed from, or moved within the performance management system. The mapping database 408 may maintain the data required for a peer device to determine which peer device to contact for data related to any computing device in the performance management system.

The mapping database 408 may interface with the database replication application 416. The database replication application 416 may maintain the mapping database 408 in synchrony with one or more copies of the mapping database 408 at other peer appliances. The database replication application 416 may provide active and/or passive database replication. The database replication application 416 may be a component of a database management system or a stand-alone application.

In an example performance management system, one peer appliance 400 may be designated as a "primary." Every other peer appliance 400 in the example performance management system may be designated as a "replicated copy." In this example, the peer appliances 400 may be programmed such that new changes to the mapping data are transacted at the primary database, and that read-only transactions are conducted locally. To illustrate, when a new computing device is added to the computer information system, information about the new computing device and the peer appliance 400 to which it is assigned may be entered and/or transferred to the primary peer appliance 400. This data is entered at the mapping database 408 of the primary peer appliance 400. Detecting the change at the mapping database 408, the replication application may propagate the change to every other peer appliance 400 in the performance management system. Thus, subsequent requests for reports that consult the mapping database, at any peer appliance 400, will have the most up-to-date topological view of the mapping between computing devices and peer appliances 400. A similar process may be employed for moving computing devices from one peer appliance 400 to another, for removing computing devices, and/or for adding and removing peer appliances 400.

The performance database 410 may maintain a collection of performance data received from computing devices. Each peer appliance 400 may be associated with a subset of computing devices, and each performance database 410 may maintain the performance data that corresponds to the computing devices to which the peer appliance 400 is associated. The performance data may be stored at any level of granularity that is provided by the computing devices. Storage capacity in the performance management system may be added by increasing the number of peer appliances 400 in the performance management system. Since each peer appliance 400 provides the processing for its own data, processing bottlenecks may be avoided.

The performance database 410 may interface with the collection application 418. The collection application 418 may provide management of the various polling and network management protocols required to collect performance data from the computing devices. The collection application 418 may maintain a session with the performance database 410. The collection application 418 may receive performance data from the computing devices and store the performance data at the performance database 410. The collection application 418 may include timing data, data formatting, and metadata, such as a device identifier when storing the received performance data in the performance database 410.

The collection application 418 may be configured to correspond with the various network management protocols supported by the individual computing devices. The collection application 418 may include a script processing module that enables it to interface with nonstandard network management protocols. For example, a script may be authored to correspond to a nonstandard network management protocol. The collection application 418 may consult the script to establish communication via the nonstandard network management protocol. The performance data collected from the individual computing devices may be stored in the performance database 410.

The peer-to-peer application 414 may be executed in connection with the processor 402 causing the processor to perform the instructions indentified by the peer-to-peer application 414. The peer-to-peer application 414 may include computer executable instructions that generate user interface screens, handle configuration tasks, manage report generation and processing, and interact with other components of the performance management system. The peer-to-peer application 414 may include a series of user interface screens that may be presented to the user via a text based terminal, via a local monitor and keyboard, and/or via the Hypertext Transport Protocol (HTTP) server to a web browser software at a user's client computer. For example, the peer-to-peer application 414 may include interactive user interface screens such as a device browser interface (e.g., for adding/removing computing devices), a system summary interface, a performance data policy editor interface (e.g., for configuration of what performance data is to be requested/received), a threshold alarm editor interface, and/or other interface screens to implement user control of the various features of the performance management system.

The peer-to-peer application 414 may maintain rules associated with the operational aspects of the performance management system. The peer-to-peer application 414 may maintain rules associated with various report formulations. The peer-to-peer application 414 may maintain rules associated with various configuration information changes. For example, the peer-to-peer application 414 may require either a "removal" or a "move" of every computing device associated with a peer appliance 400 when that peer appliance 400 is removed from the performance management system. The peer-to-peer application 414 may ensure that configuration changes are made at the primary peer appliance 400 consistent with the mapping data replication process.

The peer-to-peer application 414 may process requests for reports. The reports may include summary information, graphs, charts, tables, and the like. The peer-to-peer application 414 may enable reports to be grouped any category of data within the performance management system, such as grouping by device type (e.g., all routers), by type of performance data (e.g., all CPU utilization data), by date/time range, by device location (i.e., all U.S.-based equipment), and the like.

The peer-to-peer application 414 may provide one or more standard reports, such as application reports, Internet Protocol reports, network utilization reports, specific protocol reports (i.e., HTTP performance), Quality of Service (QoS) reports, and the like. The peer-to-peer application 414 may provide functionality for the user to create custom reports. The peer-to-peer application 414 may enable graphical representation of custom reports such as, line graphs stacked line graphs, pie graphs, and the like. The peer-topeer application 414 may enable reports to be exported to a local file, such as a portable document file (PDF), a comma separated value (CSV) file, and the like.

The peer-to-peer application 414 may provide analysis tools associated with the performance reports. For example, the peer-to-peer application 414 may present reports that include trending, such regression analysis, polynomial fit analysis, and the like. The peer-to-peer application 414 may provide average, maximum, minimum, and differential (e.g., week-over-week difference) data points. The peer-to-peer application 414 may provide busy-hour analysis for capacity planning.

Enabled by very granular performance data, drill-down report functions are available to the user. For example, a report that shows daily values of CPU utilization across a given computing device may be drilled down on a given day to show an hour by hour and/or minute-by-minute CPU utilization of that computing device. The user may select a portion of data in a given report and request that more detailed information about the selection be provided. Drilling-down into a report may include generating a new report at the drilled-down level. In response to a drill-down request, the peer-to-peer application 414 may generate a request for a new report that corresponds to the level of detailed indicated in the user's drill-down request.

The peer-to-peer application 414 may enable an alerts/alarms interface that displays current active messages in the system. These messages may include threshold violations, trap notifications, errors, and the like. The alerts/alarms interface may be automatically updated. The alerts/alarms interface may display a table of individual messages. For example, each row may include a message identifier, an identifier of the computing device with which the message is associated, the criticality of the message (e.g., emergency, alert, critical, error, warning, debug, etc.), and the message itself. Each row may be color-coded in accordance with the criticality. The alerts/alarms interface may enable filtering and sorting.

The message information associated with the alerts/alarms interface may be stored in the mapping database 408 and replicated throughout the performance management system. Because alerts tend to be critical, time-sensitive items, including them in the mapping database 408 helps ensure that the alert messages are always replicated at any peer appliance 400 and that a local query to the mapping database at any peer appliance 400 is sufficient to present the alerts/alarms interface to the user for messages across the entire performance management system.

The HTTP server 412 may include computer executable instructions that when executed send and/or receive data. The HTTP server 412 may communicate with a web browser software at a client computer. The HTTP server 412 may be a web server. The HTTP server 412 may enable user interfaces generated by the peer-to-peer application 414 to be presented via client computer's web browser software. The HTTP server 412 may receive interactive requests from the user. The HTTP server 412 may present data from the user to the peer-to-peer application 414 for processing.

Figure 5:
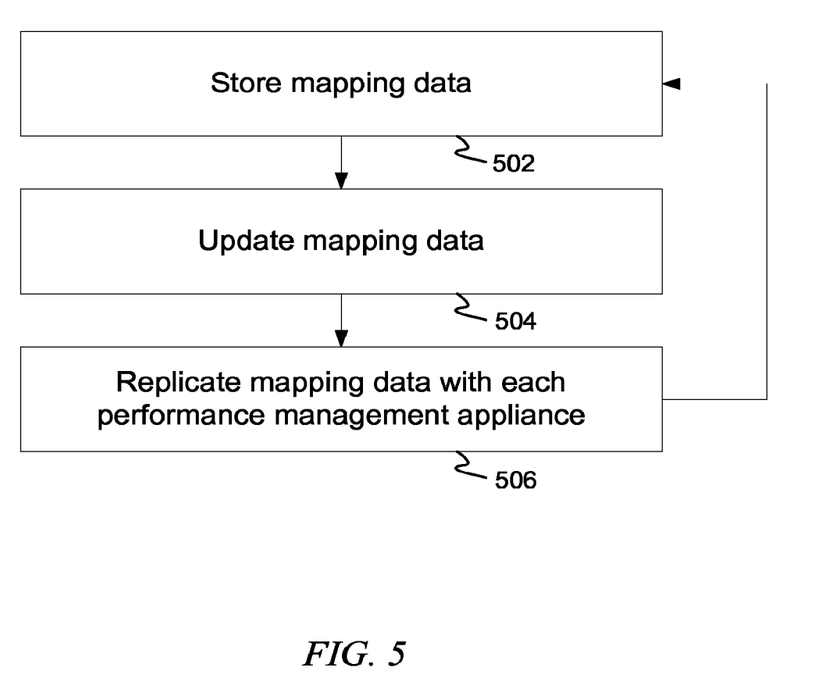
FIG. 5 is a flow chart of an example process for managing mapping data.

FIG. 5 is a flow chart of an example process for managing mapping data. At 502, mapping data may be stored. The mapping data may be stored in a mapping database in individual peer appliances. The mapping data may be stored from input by a user. The mapping data may be stored from input from a replication process. For example, when a performance management system is first deployed, a user may enter mapping data into the mapping database. The user may assign computing devices to corresponding peer appliances, storing that information in the mapping database.

The mapping data may be automatically populated as part of an automatic discovery process. For example, the peer appliances may scan a network to identify peer appliances and computing devices. A listing of the identified peer appliances and computing devices may be presented to the user. The user may edit the list, add additional information, and store the resulting mapping data. The scan may include an IP address range scan, a port scan, an Address Resolution Protocol (ARP) scan, or the like.

At 504, the mapping data may be updated. The mapping data may be updated over time, for example, when new peer appliances are added and/or removed, when computing devices are added and/or removed, and/or when the relationship between computing devices and peer appliances changes. To illustrate, a computing device may be moved from one location to another location in the computer information system. A technician may update the mapping data to reflect the new location, including reassigning the computing device to a different peer appliance.

In an embodiment, updating the mapping data may include sending the updated mapping data to a peer appliance that has been designated as a primary peer appliance. When a user makes a change to mapping data at a non-primary peer appliance, the mapping data change may be sent to the primary peer appliance to facilitate replication.

At 506, the updated change to the mapping data may be replicated across the performance management system. A database replication process may detect a change in mapping data at any peer appliance. The database replication process may send that change to every other peer appliance such that the mapping data database at each peer appliance may be kept in synchrony.

For example, a peer appliance designated as a primary such that each other peer appliance maintains a copy of the mapping data at the primary. Changes may be funneled to the primary appliance and consistently replicated across the performance management system. Thus, the performance management system may maintain current mapping information in the respective mapping database in each peer appliance. This process of storing updating and replicating may loop during normal operation of the performance management system.

Figure 6:
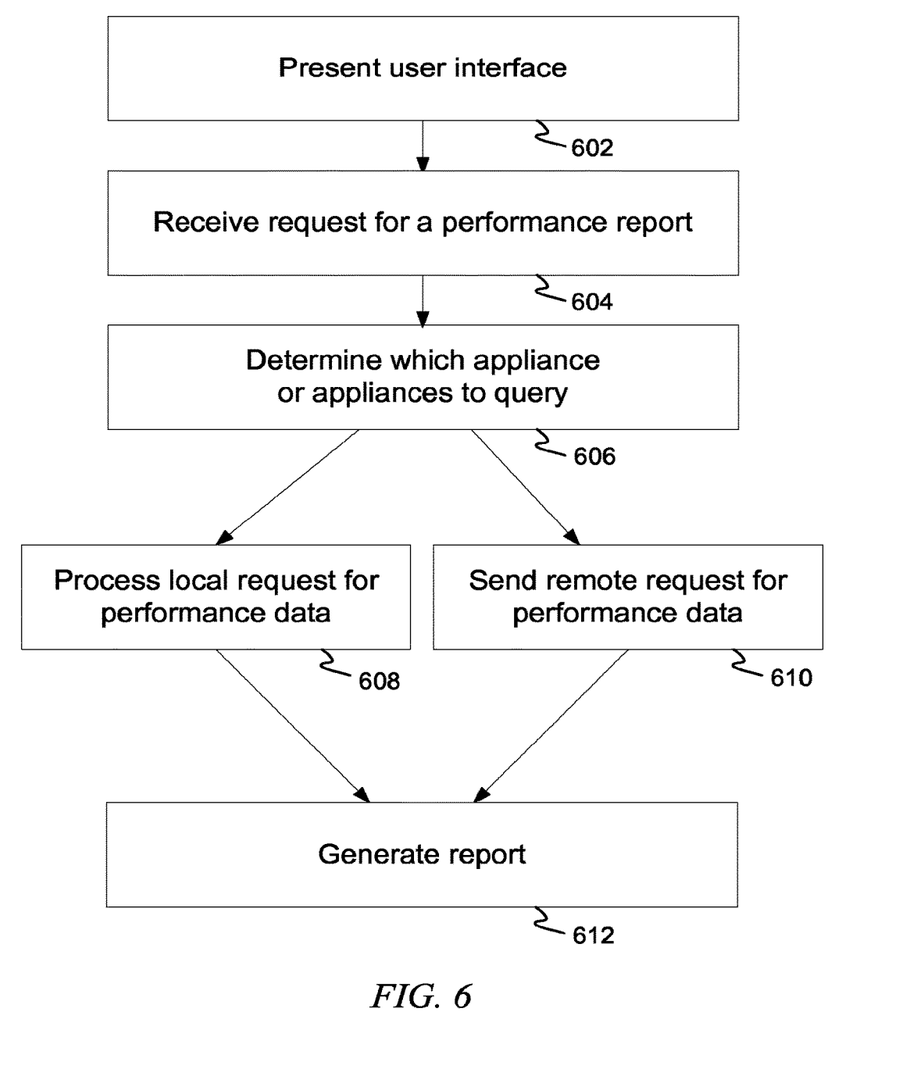
FIG. 6 is a flow chart of an example process for fulfilling a performance report request.

FIG. 6 is a flow chart of an example process for fulfilling a performance report request. At 602, a user interface may be presented to a user. A peer appliance in the performance management system may present the user interface to the user. For example, the user may login to any peer appliance via a web connection.

The user may, via the user interface, request a performance report. At 604, the peer appliance may receive the request for the performance report. The performance report may implicate the performance data corresponding to one or more computing devices across one or more peer appliances, which may or may not include the peer appliance providing the user interface to the user. The performance report may require one or more data manipulation processes to be performed, such as filtering, sorting, mathematical processing (e.g., average, maximum, minimum, trending, etc.), and the like.

At 606, the peer appliance may analyze the characteristics of the requested report and may determine which other appliance or appliances are required to generate the report. The peer appliance may determine what data is required for the report and what data manipulation processes may be required for the report. The peer appliance may consult the mapping database to determine which peer appliances host the computing devices implicated by the performance report. For example, the performance report may implicate all wireless routers. The peer appliance may determine from the mapping data which peer appliances are associated with wireless routers. The peer appliance may identify what data manipulation processes are required of each of these peer appliances. The peer appliance may formulate requests for data to each identified peer appliance. The request may identify the required data and data manipulation processes.

To illustrate, the requested performance report may implicate performance data resident at the peer appliance serving the user interface and other peer appliances. At 608, a local request for performance data may be processed. At 610, a remote request for performance data may be sent. The local request at 608 and the remote requests 610 may occur parallel, as illustrated in FIG. 6. The local request at 608 and the remote requests 610 may occur in series.

The local and remote requests may be processed by the respective peer appliances. Each peer appliance may query its performance database in accordance with the request. Each peer appliance may perform any data manipulation process identified by the request. The result of the data query and the data manipulation process may include intermediate data that is returned to be formatted into a report for the user.

At 612, the responses from the peer appliances may be received and formatted into a report. The report may be generated at the user interface for the user to view. The report may include interactive elements such as drill-down features, enabling the user to request additional data.

In processing the request for the performance report, the performance data storage function, performance data query processing, and data manipulation processing may be spread across peer appliances in the performance management system. This distributed, peer-to-peer architecture enables granular performance data to be stored, processed, and presented to the user.

What is claimed:

1. A performance management system, comprising:
   a first peer appliance structured to access a mapping database portion stored on a non-transient computer readable storage medium and to access a performance database portion stored on the non-transient computer readable storage medium;
   wherein the mapping database portion comprises a topology relationship between the first peer appliance with an associated first computing device and at least one additional peer appliance with at least one additional associated computing device;
   wherein the performance database portion comprises performance data for the first computing device and for the at least one additional associated computing device;
   wherein the first peer appliance is configured to generate an updated topology relationship between peer appliances and associated computing devices in the mapping database portion in response to a network topology change and to generate a performance report using the updated topology relationship and the performance database portion; and
   wherein the first peer appliance is configured to provide the performance report to a user interface, wherein at least one of the first peer appliance or the at least one additional peer appliance serves the user interface.

2. The performance management system of claim 1, wherein the mapping database portion is stored on the first peer appliance.

3. The performance management system of claim 2, wherein the network topology change comprises at least one activity selected from activities consisting of: adding a peer appliance to the performance management system, removing a peer appliance from the performance management system, adding a computing device associated with at least one peer appliance, and removing a computing device associated with at least one peer appliance; and
   wherein the first peer appliance is further configured to propagate the updated topology relationship to the at least one additional peer appliance.

4. The performance management system of claim 3, wherein the network topology change comprises adding a computing device associated with at least one peer appliance, and removing an association of the computing device from at least one other of the at least one peer appliance.

5. The performance management system of claim 1, wherein the first peer appliance is further configured to update the performance database portion in response to the updated topology relationship, and to propagate the updated performance database portion to the at least one additional peer appliance.

6. The performance management system of claim 1, wherein the first peer appliance comprises a primary peer appliance, and wherein the first peer appliance is configured to update the performance database portion for the first peer appliance with performance data for associated computing devices before updating the mapping database portion in response to the network topology change.

7. The performance management system of claim 1, wherein the first peer appliance is further structured to query new peer appliances for performance data in response to the updated topology relationship.

8. A method, comprising: accessing a mapping database portion stored on a non-transient computer readable storage medium and a performance database portion stored on the non-transient computer readable storage medium;
   wherein the mapping database portion comprises a topology relationship between (i) a first peer appliance with an associated first computing device and (ii) at least one additional peer appliance with at least one additional associated computing device;
   wherein the performance database portion comprises corresponding performance data for the associated first computing device and performance data for the at least one additional associated computing device;
   detecting a network topology change;
   generating an updated topology relationship in the mapping database portion in response to the detecting the network topology change; and
   generating a performance report using the updated topology relationship and the performance database portion; and
   providing the performance report to a user interface, wherein at least one of the first peer appliance or the at least one additional peer appliance serves the user interface.

9. The method of claim 8, wherein detecting the network topology change comprises detecting an added peer appliance to a performance management system.

10. The method of claim 8, wherein detecting the network topology change comprises detecting a removal of a peer appliance from a performance management system.

11. The method of claim 8, wherein the detecting the network topology change comprises detecting an added computing device associated with at least one peer appliance.

12. The method of claim 8, wherein the detecting the network topology change comprises detecting a removal of a computing device associated with at least one peer appliance.

13. The method of claim 12, wherein the detecting the network topology change further comprises detecting adding of the computing device associated with at least one peer appliance to at least one other of the at least one peer appliance.

14. The method of claim 8, further comprising propagating the updated topology relationship to the at least one additional peer appliance.

15. The method of claim 8, further comprising storing the mapping database portion on the first peer appliance.

16. The method of claim 15, further comprising updating the performance database portion in response to the updated topology relationship, and propagating the updated performance database portion to the at least one additional peer appliance.

17. The method of claim 8, wherein the first peer appliance comprises a primary peer appliance, and updating the performance database portion with performance data for the associated computing devices of the first peer appliance before updating the mapping database portion in response to the network topology change.

18. The method of claim 8, further comprising querying new peer appliances for performance data for associated computing devices in response to the updated topology relationship.

19. A method, comprising: accessing a mapping database portion stored on a non-transient computer readable storage medium and a performance database portion stored on the non-transient computer readable storage medium;

wherein the mapping database portion comprises a topology relationship between a first peer appliance with an associated first computing device and at least one additional peer appliance with at least one additional associated computing device;

wherein the performance database portion comprises performance data for the first computing device and for the at least one additional associated computing device;

detecting a network topology change;

transmitting an alert containing message information relating to the detected network topology change; and generating an updated topology relationship between peer appliances and associated computing devices in the mapping database portion in response to the detected network topology change, and storing the message information; and generating a performance report about a set of computing devices using the updated topology relationship and the performance database portion.

20. The method of claim 19, wherein the alert is transmitted to a remote client computer.

21. The method of claim 19, wherein the performance data for computing devices associated with each of the at least one additional peer appliance is processed individually by each associated peer appliance.

22. The method of claim 21, further comprising querying the mapping database portion at an individual one of associated peer appliances for the message information, thereby retrieving alerts for all peer appliances.

23. The method of claim 19, further comprising providing the performance report to a user interface, wherein at least one of the first peer appliance or the at least one additional peer appliance serves the user interface.

* * * * *

UNITED STATES PATENT AND TRADEMARK OFFICE
CERTIFICATE OF CORRECTION

PATENT NO. : 10,491,486 B2  
APPLICATION NO. : 15/489281  
DATED : November 26, 2019  
INVENTOR(S) : Vesselin Bakalov Page 1 of 1

It is certified that error appears in the above-identified patent and that said Letters Patent is hereby corrected as shown below:

In the Specification

Column 6, Line 43, delete "network" and insert -- Network --, therefor.

Column 8, Line 18, delete "indentified" and insert -- identified --, therefor.

Signed and Sealed this  
Fourth Day of February, 2020

Andrei Iancu  
*Director of the United States Patent and Trademark Office*